United States Patent
Colgan et al.

(10) Patent No.: US 6,648,485 B1
(45) Date of Patent: Nov. 18, 2003

(54) HIGHLY COLLIMATING TAPERED LIGHT GUIDE FOR UNIFORM ILLUMINATION OF FLAT PANEL DISPLAYS

(75) Inventors: Evan G. Colgan, Chestnut Ridge, NY (US); Fuad E. Doany, Katonah, NY (US); Akiko Nishikai, Kanagawa (JP); Rama N. Singh, Bethel, CT (US); Masaru Suzuki, Kanagawa (JP); Yoichi Taira, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/711,041

(22) Filed: Nov. 13, 2000

(51) Int. Cl.$^7$ ................................................. F21V 7/04
(52) U.S. Cl. ........................... 362/31; 362/331; 362/561
(58) Field of Search ............................ 362/26, 31, 331, 362/551, 561

(56) References Cited

U.S. PATENT DOCUMENTS

| | | | |
|---|---|---|---|
| 5,598,281 A | | 1/1997 | Zimmerman et al. |
| RE35,704 E | | 12/1997 | Chiba et al. |
| 5,711,589 A | | 1/1998 | Oe et al. |
| 5,863,113 A | | 1/1999 | Oe et al. |
| 5,926,601 A | | 7/1999 | Tai et al. |
| 6,048,071 A | * | 4/2000 | Sawayama .................... 349/63 |
| 6,086,212 A | * | 7/2000 | Onishi et al. ................ 349/65 |
| 6,164,790 A | * | 12/2000 | Lee ............................. 362/31 |
| 6,220,741 B1 | * | 4/2001 | Kawachi et al. .............. 362/26 |
| 6,497,492 B1 | * | 12/2002 | Benoit et al. ................. 362/19 |

OTHER PUBLICATIONS

Kalantar et al., "34.2: Functional Light–Guide Plate for Backlight Unit," SID 99 Digest, pp. 764–767.
Kalantar et al., "43.2: Optical Micro Deflector Based Functional Light–Guide Plate for Backlight Unit," SID 00 Digest, pp. 1029–1031.
McFarland et al., "S32–4 Invited SpectraVue™ Viewing Angle Enhancement System for LCDs," Asia Display 1995, pp. 738–742.
Zimmerman et al., "36.2: Viewing–Angle–Enhancement System for LCDs," SID 95 Digest, pp. 793–796.

* cited by examiner

Primary Examiner—Sandra O'Shea
Assistant Examiner—John Anthony Ward
(74) Attorney, Agent, or Firm—Robert M. Trepp; Frank V. DeRosa

(57) ABSTRACT

A light guide system has a light guide having a first end portion opposite a second end portion. The light guide provides a first surface and a second surface between the first and second end portions, and the second surface is inclined relative to the first surface. A light source is disposed along the first end portion on a first axis. A light redistribution device is disposed on an entrance of the light guide for receiving light from the light source and redistributing a portion of the light perpendicular to the first axis to provide a uniform light distribution from the first surface.

35 Claims, 11 Drawing Sheets

HIGHLY COLLIMATING TAPERED LIGHT GUIDE FOR UNIFORM ILLUMINATION OF FLAT PANEL DISPLAYS

BACKGROUND OF THE INVENTION

1. Field of the Invention

The present invention relates to light guides for illumination, and more particularly to a tapered collimating light guide for flat panel displays.

2. Description of the Related Art

In a typical portable display backlight unit, a triband cold cathode fluorescent lamp (CCFL) is coupled to one edge of a tapered Acrylic light guide where a white reflector and a variable density pattern of printed dots or molded microstructure such as ridges, etc. are formed on the bottom surface of the light guide to scatter light and generate a uniform distribution of light which exits the light guide.

Figure 1:
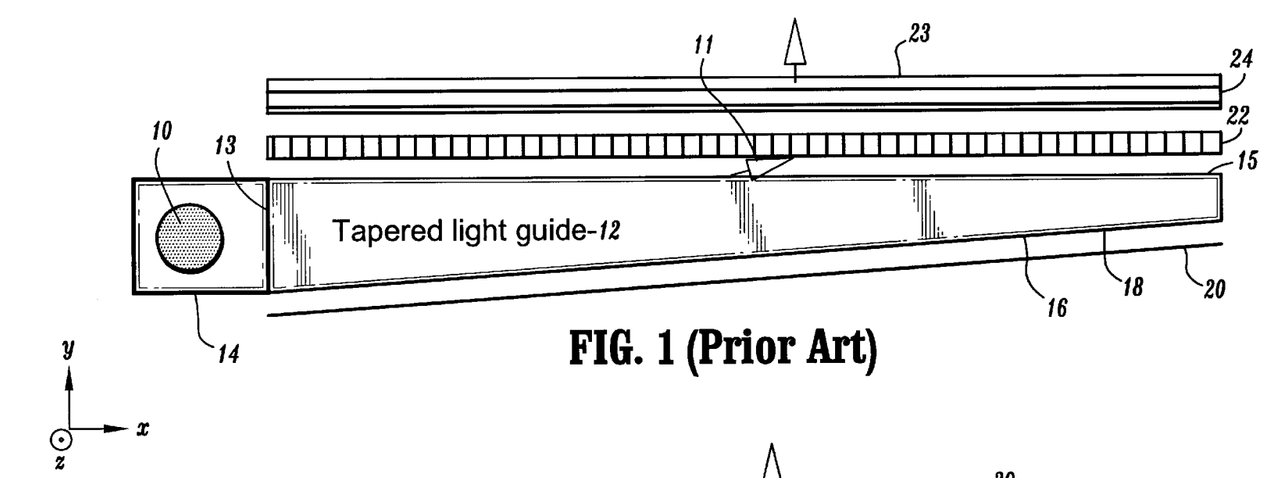
FIG. 1 is a side view of a light guide system having a light guide with variable density printed dots or molded microstructures for light uniformity, the system employing ridge sheets to form a grid to collimate light in accordance with the prior art.

Referring to FIG. 1, a side view of one display arrangement is shown. A light source 10 is coupled to a tapered light guide 12 for introducing light into light guide 12. Light source 10 includes a cold cathode flourescent lamp (CCFL) which is elongated into and out of the plane of the page. Source 10 also typically includes a reflector 14 for directing light into light guide 12. A dot pattern or microstructures 16 are formed on a surface 18 to diffuse light incident on surface 18. Light 11 exits guide 12 in twin peaks at angles of about 50 degrees and 80 degrees off normal with a full width half maximum distribution (FWHM) of ±30 degrees in the case of a printed white "dot" pattern on surface 18 and in twin peaks at angles of about 60 degrees and about 80 degrees off normal with a FWHM distribution of ±20 degrees in the case of microstructured ridges on surface 18. A white reflector sheet 20 is spaced apart from and runs parallel to surface 18 to redirect light back towards guide 12. Typically, a pair of crossed ridge sheets 22 and 24 with a diffuser sheet 23 are used to redirect the light normal to light guide 12 and to somewhat collimate the light (about ±25 degrees FWHM horizontal & vertical). Ridge sheets 22 and 24 include parallel running spaced ridges. Ridges on sheet 22 run perpendicular to ridges on sheet 24.

Recently, an alternate approach using a prism bending sheet has been disclosed by Mitsubishi Rayon in U.S. Pat. Nos. Re 35,704, 5,711,589, and 5,863,113. In these patents, the pair of crossed "ridge sheets" is replaced by a single prism bending sheet 30, as shown in FIG. 2.

Figure 2:
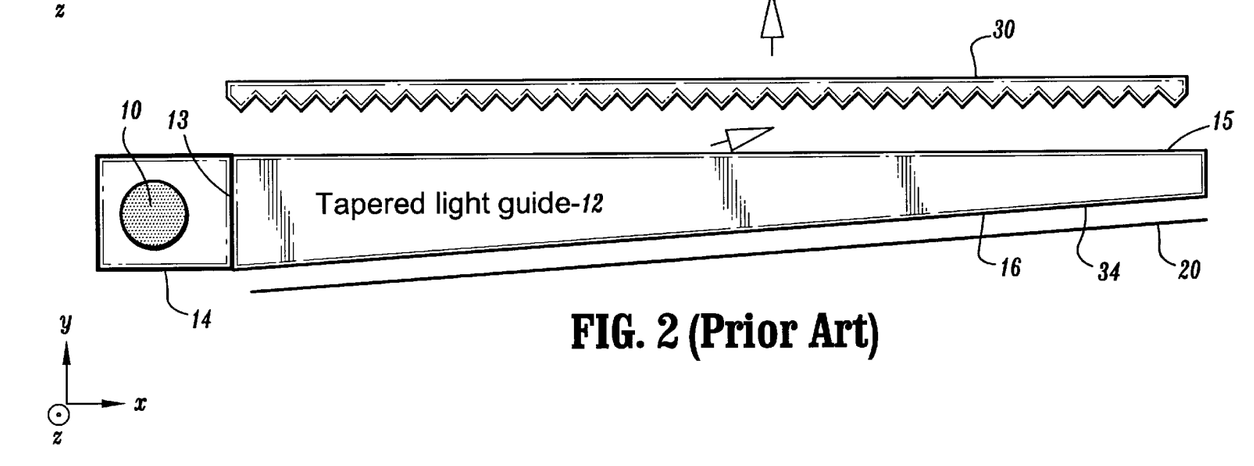
FIG. 2 is a side view of a light guide system having a light guide with variable density printed dots or molded microstructures for light uniformity, the system employing a prism bending sheet to collimate light in accordance with the prior art.

Referring to FIG. 2, prism bending sheet 30 redirects the light which exits the light guide into a direction normal to the light guide where surface texture or microstructure variation along the light guide on surface 34 is used to produce a uniform light distribution. The use of a bending sheet 30 has significant advantages in that only one sheet is required instead of two, and it can result in more collimated light in the direction along the length of the guide, but the degree of collimation which can be achieved is limited by the surface texture or microstructure along the guide which controls the extraction of light to achieve uniform illumination. The prism bending sheet preserves the degree of collimation of the light output by the light guide in the total internal reflection (TIR) direction unlike the ridge sheets as shown in FIG. 1.

A very high degree of collimation in the direction along the guide can be achieved by a tapered light guide with both major surfaces flat and with a mirror underneath instead of a white reflector, but the light distribution along the length of the guide is very nonuniform.

Figure 3A:
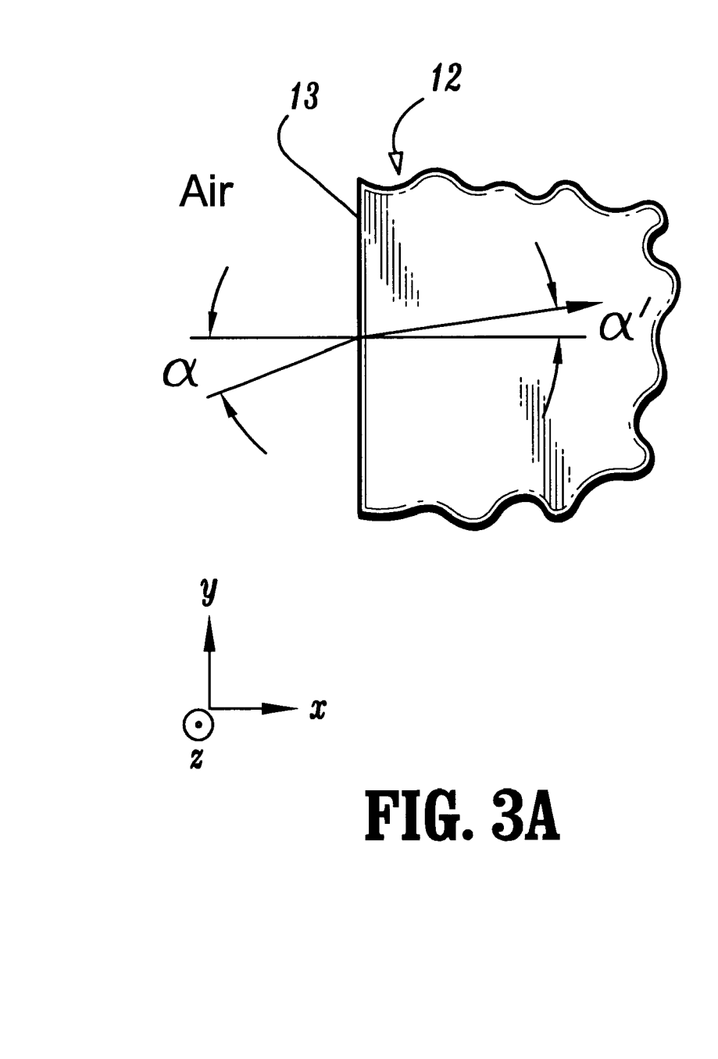
FIGS. 3A and 3B schematically depict light entering light guide.
Figure 3B:
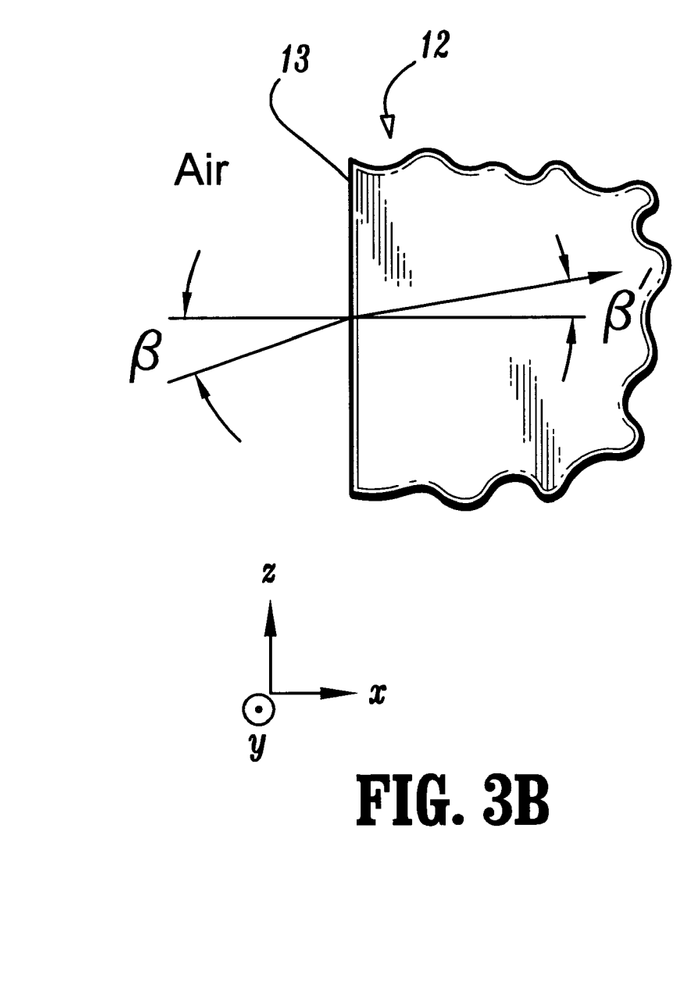

Conventional backlight designs provide a flat entrance surface 13 angled at about 90 degrees with the top surface (exit surface 15) of the light guides 2 of FIGS. 1 and 2. With reference to the coordinate system of FIG. 2, FIGS. 3A and 3B shown the interface between air and light guide 12 at entrance edge 13. Light enters at entrance edge 13 for −90 degrees $\leq \alpha \leq 90$ degrees and −90 degrees $\leq \beta \leq 90$ degrees, where $\alpha$ is the input angle of light from the x-axis in the x-y plane and $\beta$ in the input angle of light from the x-axis in the x-z plane. $\alpha'$ and $\beta'$ are corresponding angles in the light guide after refraction. The angular distribution of light is reduced according to Snell's law when light propagates into light guide 12, which has a higher index of refraction than air (e.g., n=1.49 for acrylic). If entrance edge 13 is 3.5 mm thick, taper angle is 0.5 degrees surface 16 and n=1.49 for light guide 12, then the initial light distribution in the acrylic light guide is −42 degrees $\leq \alpha' \leq 42$ degrees and −42 degrees $\leq \beta' \leq 42$. Considering only the x-y plane, $\alpha'$ is increased each time propagating light is reflected from surface 16 until the angle for TIR (e.g. 48 degrees) is exceeded. If structures of the prior art did not include a dot pattern or microstructure on surface 16 (See FIGS. 1 and 2), light must propagate about 40 mm in the x direction before TIR is exceeded. This creates an undesirable dark region adjacent to entrance edge 13.

There are a number of applications where it is desirable to have very highly collimated light exit the light guide. The primary application is to make a "collimate and post diffuse" (CPD) type of display as has been described previously in Zimmerman et al. in SID '95 Digest, pp. 793–796 and McFarland et al. in Asia Display '95 Digest, pp. 739–742. The system as described in these publications and their respective patent (e.g., U.S. Pat. No. 5,598,281) is not practical for many applications due to the thickness and cost required to manufacture the complicated structures described therein.

A number of recent publications including Kalantar et al. SID '99 Digest, pp. 764, Kalantar et al. SID '00 Digest pp.1029–1031, have described that by forming ridges along one major surface of the light guide perpendicular to the axis of the CCFL (axis running into the page for example in FIGS. 1 and 2), the output light can be collimated in the direction across the guide (where "across the guide" is perpendicular to "along the guide" which is perpendicular to the axis of the CCFL). See also U.S. Pat. No. 5,926,601.

Therefore, a need exists for a light guide system which efficiently provides a more uniform light distribution at the output of a light guide while maintaining a highly collimated light output.

SUMMARY OF THE INVENTION

A light guide system has a light guide having a first end portion opposite a second end portion. The light guide provides a first surface and a second surface between the first and second end portions, and the second surface is inclined relative to the first surface. A light source is disposed along the first end portion on a first axis. A light redistribution device is disposed at an entrance of the light guide for receiving light from the light source and redistributing a portion of the light perpendicular to the first axis to provide a uniform light distribution from the first surface.

Another light guide system includes a light guide having a first end portion opposite a second end portion, and the light guide includes a first surface and a second surface between the first and second end portions. The second surface is inclined relative to the first surface. A light source is disposed along the first end portion wherein the first end portion defines a first axis and the light source extends along the first axis. A structured entrance is formed in the first end portion of the light guide, and the structured entrance includes a plurality of angled surfaces extending along the first axis for redirecting light received from the light source.

A light guide system for liquid crystal displays includes a light guide having a first end portion opposite a second end portion, the light guide including a first surface and a second surface between the first and second end portions, the second surface being inclined relative to the first surface. A light source is disposed along the first end portion wherein the first end portion defines a first axis and the light source extends along the first axis. A reflector surrounds a portion of the light source and extends along the first axis to reflect light from the light source into the light guide. A mirror is disposed parallel to the second surface. A structured entrance is formed in the first end portion of the light guide, the structured entrance including a plurality of angled surfaces extending along the first axis for redirecting light received from the light source. A liquid crystal pixel array is disposed in operative relationship with the first surface for receiving light directed from the first surface to render an image.

In other embodiments, the light guide system includes a mirror disposed parallel to the second surface. The first surface and the second surface are preferably smooth (e.g., without roughness or dot patterns) and more preferably uniformly smooth. The second surface may be inclined relative to the first surface to produce collimated light by total internal reflection along the light guide. The light redistribution device may include a structured entrance surface for the light guide. The structured entrance surface may include a plurality of ridges extending parallel to the first axis. The plurality of ridges is preferably integrally formed in the light guide.

The structured entrance surface may include at least one facet forming an angle other than a perpendicular angle with the first surface and extending parallel to the first axis. The structured entrance surface may include at least one curved surface extending parallel to the first axis. The light guide system may include a plurality of ridges extending perpendicular to the first axis. The light guide system may include a plurality of ridges disposed on the first surface and extending perpendicular to the first axis. The light guide system may further include a black material separated by a gap from at least one of the first surface and the second surface of the light guide for absorbing a portion of the light from the light source. The plurality of ridges may include triangular shaped cross-sections. The light guide system may include a faceted reflector adapted to redirect light entering the light guide. The light guide system includes a liquid crystal display which may be a collimate and post diffuse display or a color filterless display.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a very highly collimated light output by employing a light guide with a smooth surface or surfaces. In one embodiment, two major smooth surfaces are provided. In another embodiment, one smooth surface is provide for one surface of the light guide, and ridges perpendicular to a light source axis are provided on a second surface of the light guide.

These smooth surfaced light guides produce a uniform distribution of light along the light guide by control of the angular distribution of light entering the light guide, in accordance with the invention. This may be accomplished by microstructure along a portion of an input surface of the guide or by the combination of a structure which couples the light from the light source into the guide and a portion of the input surface of the guide which is not perpendicular to the major surface which illuminates the display and modifies the angular distribution of light in an appropriate manner.

In the prior art, printed dots or microstructures along a major surface of the light guide are varied to produce uniform illumination by scattering or extracting the light so that it exits the lightguide. However, dots or microstructures inherently decrease the collimation along the total internal reflection (TIR) direction of the guide.

In one aspect of the present invention, light is collimated entering the light guide in the direction "across" the light guide prior to entering the guide if such collimation is needed. This has a significant advantage over the prior art in that a very high degree of collimation can be achieved in the direction along the light guide and also in the perpendicular direction if it is desired. These and other advantages will be explained in greater detail below.

Figure 4A:
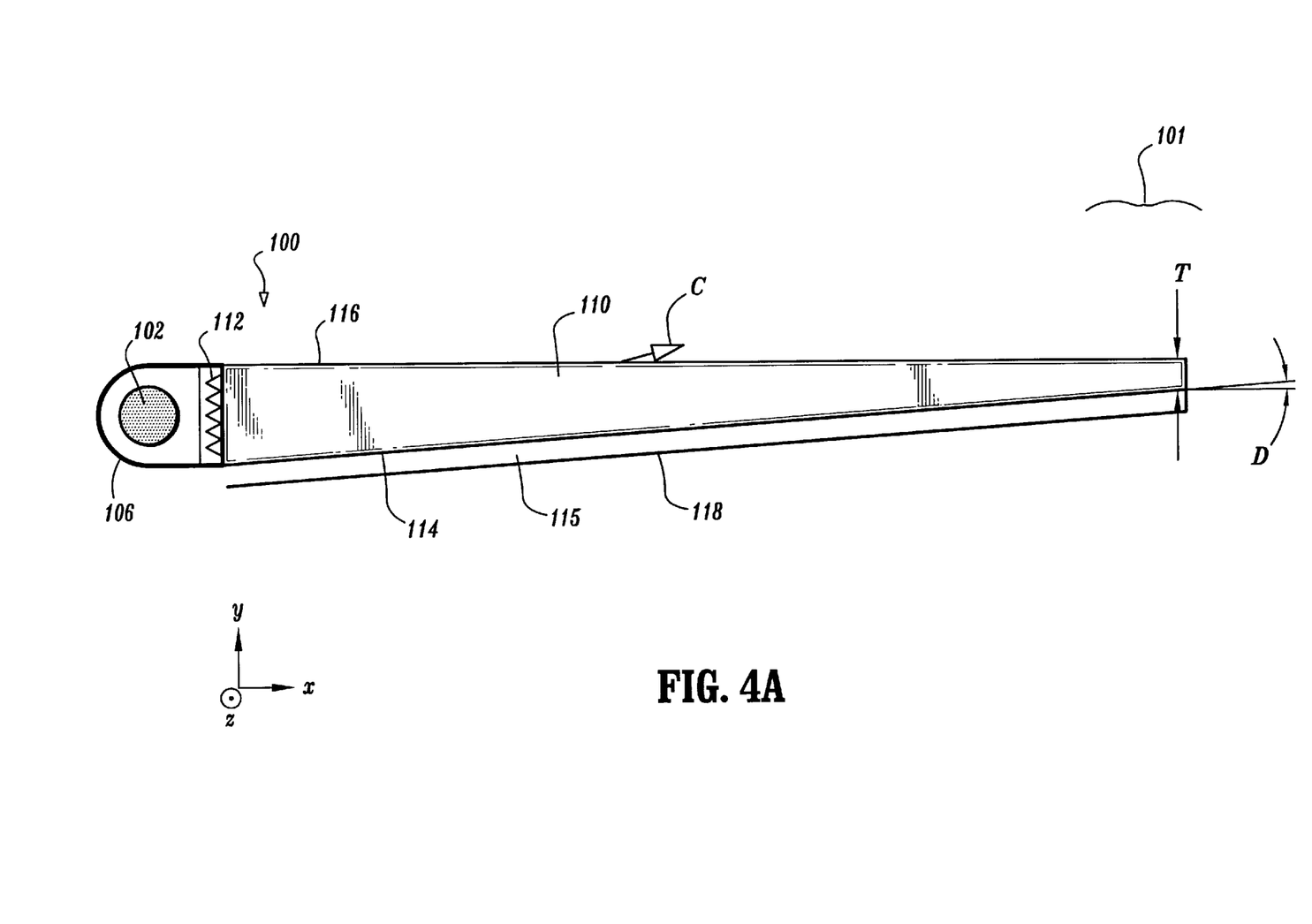
FIG. 4A is a side vide of a light guide system having horizontal ridges or facets on the input edge of a light guide in accordance with the present invention.

Referring now in detail to the figures in which like numerals represent the same or similar elements, and to FIG. 4A, a backlight system 100 is illustratively shown in accordance with one embodiment of the present invention. System 100 includes a light source 102, which may include a cold cathode fluorescent lamp (CFL). System 100 will be described with the aid of a coordinate system. In the coordinate system, the x and y directions are parallel to the plane of the page while the z axis extends into and out of the plane of the page. Light source 102 extends along the z-direction and is preferably surrounded by a reflector 106, which also extends in the z-direction.

The present invention modifies the angular distribution of light along the y-axis (perpendicular to the light axis) going into a tapered light guide 110 to achieve a more uniform output distribution along the x-direction (along the length of light guide 110). A taper angle "D" is provided.

Surprisingly, by providing this light distribution into light guide 110, which can depend on an angle "D" of the light guide 110, the index of refraction, n, of the light guide 110, the index of refraction of any coatings on the light guide and/or the dimensions of the light guide, uniform illumination of a display, such as a liquid crystal display (LCD) can be achieved. This is an unexpected result in view of the prior art conventional backlight designs, which provide a flat entrance surface 13 angled at 90 degrees with the top surface (exit surface 15) of the light guides 12 of FIGS. 1 and 2.

The present invention provides an input surface or structure 112 to light guide 110, shown generally as structure 112, to redistribute light entering the light guide 110 to more evenly distribute light exiting form surface 116. Structure 112 is disposed between light guide 110 and light source 102 to direct light so that some light quickly breaks TIR and exits guide 110 after only reflecting a few times in the guide. In a preferred embodiment structure 112 includes ridges or facets. For an acrylic light guide, ridges provide an α' of 48 degrees instead 42 degrees so that some light quickly breaks TIR.

Light guide 110 preferably includes an angled surface 114 and a surface 116 opposite surface 114. In one embodiment, both surface 114 and 116 are smooth. This means that intentionally applied roughness, dot patterns or microstructures are not present and surfaces do not cause additional light diffusion normally provided by such structures. A mirror 118 is provided to reflect light exiting from light guide 110 from surface 114 back up through guide 110 and out of surface 116. An air gap 115 may be provided between mirror 118 and surface 114.

Figure 4B:
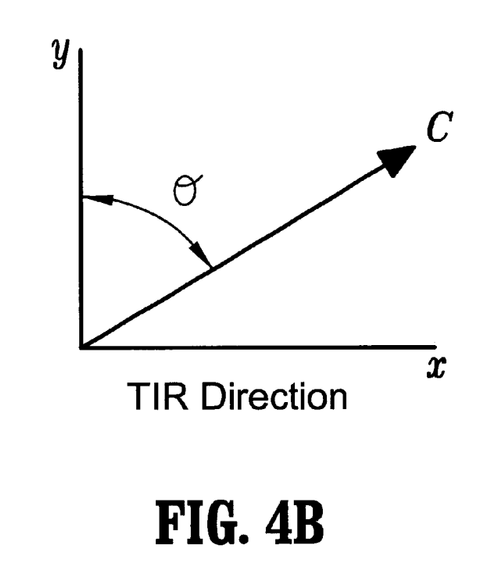
FIGS. 4B and 4C schematically depict light exiting light guide and define TIR and non-TIR directions.
Figure 4C:
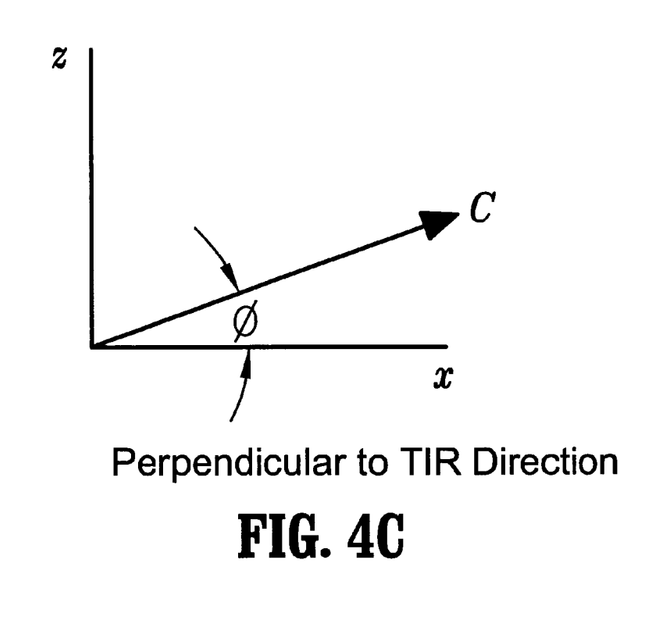

As shown in FIG. 4A, light from source 102 passes through structure 112 (e.g., facets or ridges) and is redistributed to larger values of α' closer to the critical angle for breaking TIR than would result from a planar input surface oriented perpendicular to the exit surface 116. The light enters light guide 110 and is internally reflected until the angle for TIR is exceeded. Advantageously, in accordance with the present invention, TIR is reached faster for a larger amount of light than the prior art light guides (see FIGS. 1 and 2). This is provided by redistributing light perpendicular to the axis of light source 102 (z-axis). As light exits guide 110, the light is either reflected off mirror sheet 118 and back through guide 110 in the direction of arrow "C" or is directed in the direction of arrow "C" from surface 116. Referring to FIGS. 4B and 4C, angle θ is the direction of light with respect to the normal direction of surface 116 in the x-y plane and angle φ is the direction of light with respect to the x-axis (along surface 116 of guide 110) in the x-z plane. The degree of collimation of the light depends on the distributions of light in these two directions and is characterized by the angle between the 50% peak brightness points, i.e., the full width half maximum (FWHM). The collimation in the x-y plane is produced by the total internal reflection (TIR) in the light guide and is characterized by the FWHM of the output distribution in θ. The collimation in the direction perpendicular to the TIR direction is characterized by the FWHM of the output distribution in φ.

One difference between the present invention and the prior art is that in the present invention the means of collimation and achieving a uniform illumination have been separated so that features (dots, roughness, microstructures, etc.) are not required along the guide for uniformity which would degrade the collimation. Higher efficiencies for the back light system 100 may also be achieved by decreasing a thickness T of exit end 101 of guide 110. By making T as thin as possible the amount of light lost is minimized.

A number of embodiments are possible to control the initial angular distribution of light in the light guide 110 for uniform illumination. For example, structures may be included in combination with device 112. These structures may be formed or added on the input end of light guide 110 and include, for example, ridges, bumps, prisms, lenses or other optical structures. Alternate embodiments may include the use of an external device, such as a ridge sheet, to modify the angular distribution of light in the y-x plane (i.e., the distribution of α) which is incident on the input end of the light guide and/or to change the angle of the input surface relative to the output surface (i.e., other than perpendicular) so that enough light in the guide has a value of α' near the TIR angle so that uniform illumination results. For example, collimation in a non-TIR direction may be achieved by pre-collimating β with a ridge sheet or other structure between light source 102 and guide 110. This results in collimation in the non-TIR direction (φ). In addition or alternately, structures, such as ridges, may be added along the x direction to the top or bottom of light guide 110 to collimate light in the non-TIR direction (φ).

The structures may include a transmissive patterned optical sheet between light source 102 and light guide 110. Reflector 106 may also be modified to provide somewhat collimated light into guide 110. For example, reflector 106 may be faceted in shape to redirect light at an angle. Note that these embodiments may also be used in combination. Additionally, optical structures can be used to couple multiple lamps (light sources 102) into a single light guide to increase the total brightness.

Figure 5:
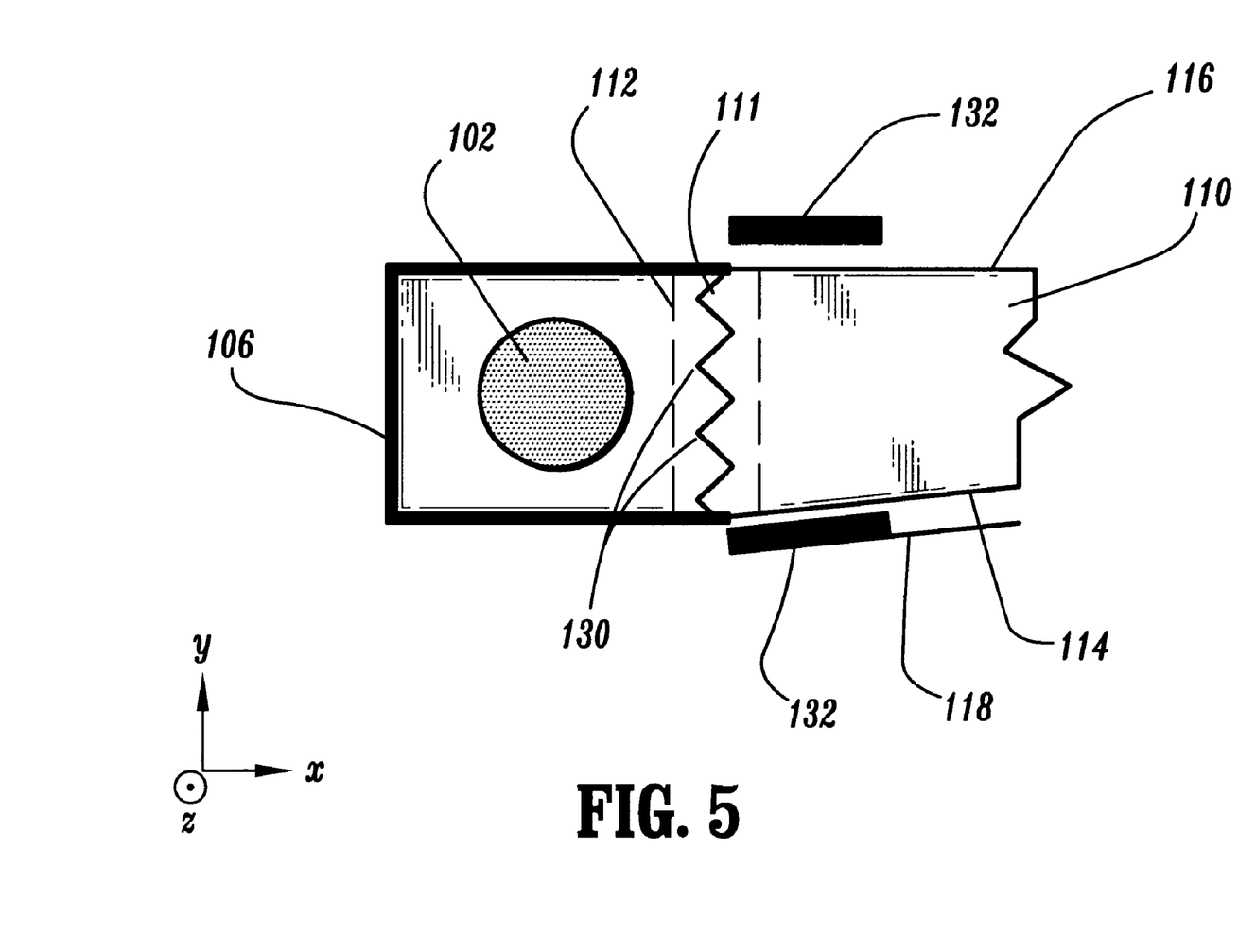
FIG. 5 is a partial side view of a light guide system which employs ridges integrally formed in an entrance edge of a light guide to produce a uniform distribution of collimated light in accordance with the present invention.

Referring to FIG. 5, consider the case of FIG. 4A where light guide 110 includes two smooth surfaces 114 and 116 and a mirror 118 below surface 114 with an air gap 115. In this case, the light distribution exiting light source 102 is modified by device 112 which includes ridges 130 on an entrance edge 111 of light guide 110 which are preferably parallel to the axis (z-axis) of light source 102.

A "dark" region near light source 102 may be produced if light enters at a lower angle ($\alpha'$) than the angle for TIR. With a typical Acrylic guide material (e.g., optical index of about 1.49), the critical TIR angle is, for example, about 42 degrees from normal. With a flat entrance edge of a guide perpendicular to the exit surface, as shown for conventional systems in FIGS. 1 and 2, this is not physically possible because the corresponding angle ($\alpha'$) in the Acrylic of the guide would be about 48 degrees, which would need an angle ($\alpha$) of greater than 90 degrees in air. By using a series of ridges or prisms 130 parallel to light source 102 (i.e., extending along the z-axis) along entrance edge 111 of the guide 110, the input light can be bent to higher angles so that light immediately begins exiting guide 110 after being trapped briefly by TIR. This eliminates or reduces the "dark region" produced by prior art devices. Ridges 130 may form peak angles of between about 75 degrees to about 140 degrees and may be integrally formed on light guide 110.

Depending on the input distribution of light onto the horizontal ridges 130, a "black" mask 132 formed of a light absorbing material, may be provided separated by air gaps from surfaces 114 and 116 of guide 110 near light source 102 to block the exit of any light which is not trapped by TIR in guide 110. Since this light is not trapped by TIR, it is not highly collimated and hence not useful.

Figure 6:
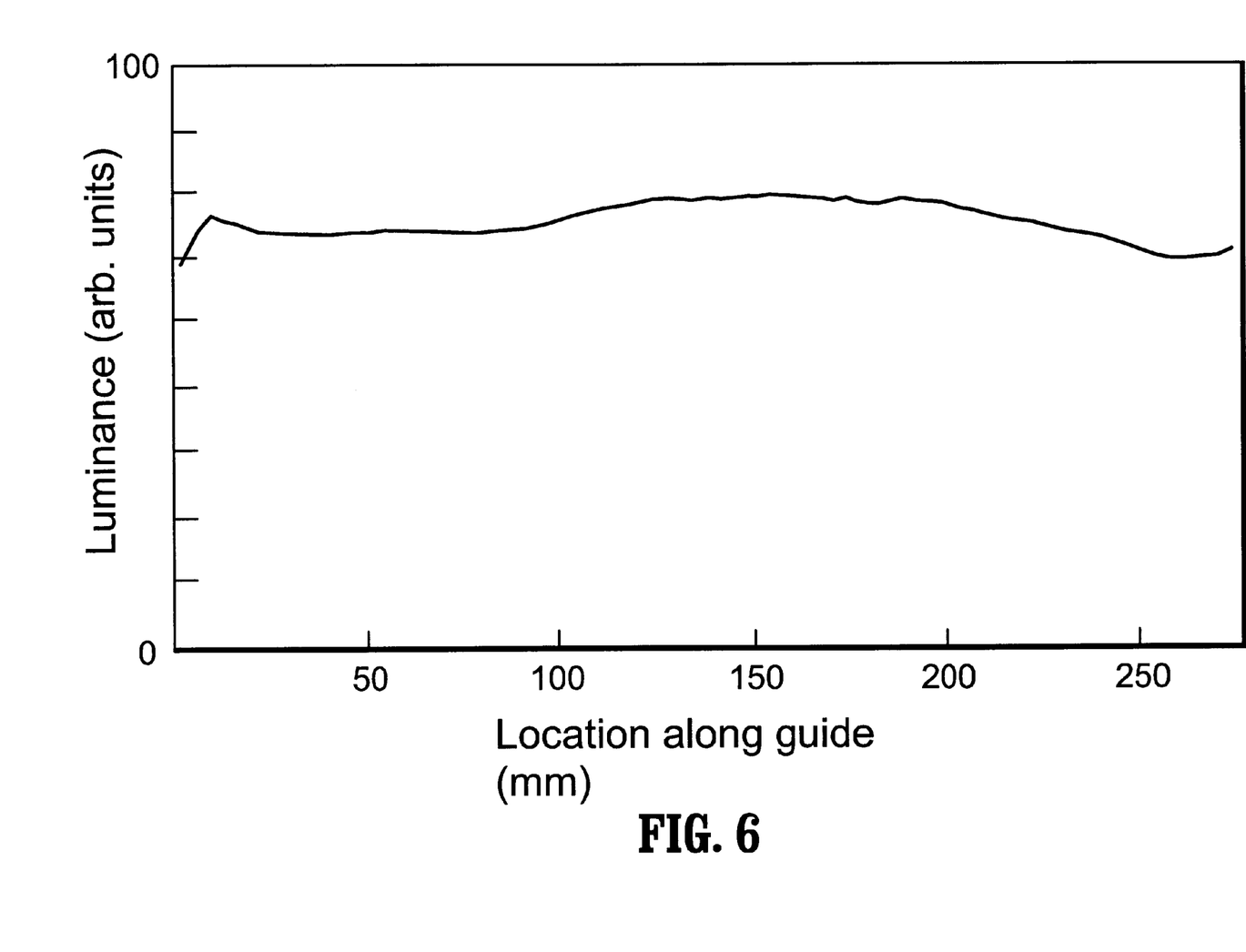
FIG. 6 is a plot of intensity versus position along a light guide showing a uniform intensity distribution in accordance with the present invention.

Referring to FIG. 6, as an example, the following measured result uses 90 degree peak angle ridges 130 (FIG. 5) formed from an n=1.58 index material where the ridges occupied about 72% of the entrance edge 111 (FIG. 5) of the guide to which they were attached. FIG. 6 shows intensity (in arbitrary units) plotted versus location along a light guide (along surface 116 in the x direction) for the system shown in FIG. 5. As is apparent from the plot a very uniform output distribution was achieved along the light guide (distribution with respect to x position), in accordance with the invention.

In the case described with reference to FIG. 5, guide 110 has two flat surfaces 114 and 116, and collimation is achieved in the TIR direction (see FIG. 4B). Based on a simulation performed by the inventors, the collimation is ±4.5 degrees FWHM in the TIR direction and ±47 degrees FWHM in the non-TIR direction (see FIG. 4C). Note that the light exits the light guide with a peak brightness at $\theta=81$ degrees, so for a collimate and post diffuse type display, a bending sheet is employed to redirect the peak to $\theta=0$ degrees. In this example, the taper angle of the light guide was 0.55 degrees.

Where the light guide has two smooth surfaces (FIG. 5), a width of the TIR collimated peak depends on a taper angle "D" of light guide 110 (FIG. 5). Note that a smaller angle provides better collimation.

Figure 7:
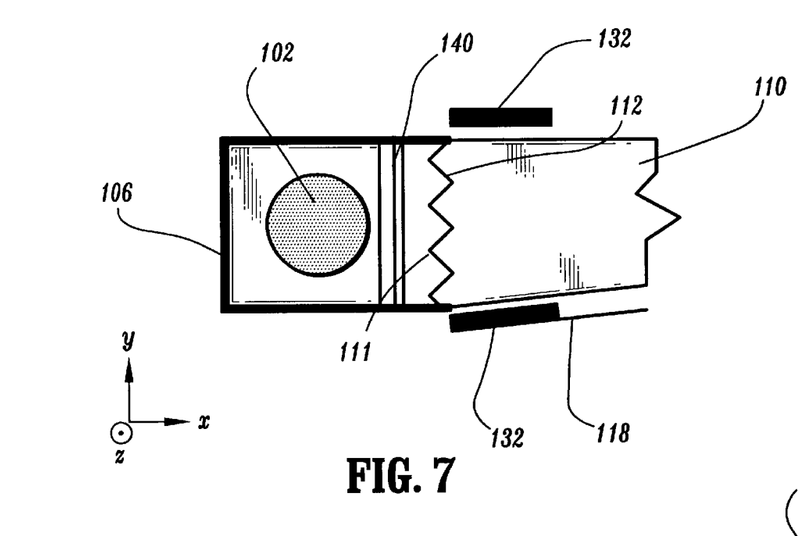
FIG. 7 is a partial side view of a light guide system which employs a collimating element sheet with ridges oriented perpendicular to an axis of a light source to collimate light in accordance with the present invention.

Referring to FIG. 7, in an alternate embodiment, collimation may be desired in a direction perpendicular to the TIR direction (in $\phi$). If collimation is also desired in the direction perpendicular to the TIR direction, a collimating element 140, such as a ridge sheet, prism sheet or other collimating elements may be added between light source 102 and light guide 110.

Figure 8:
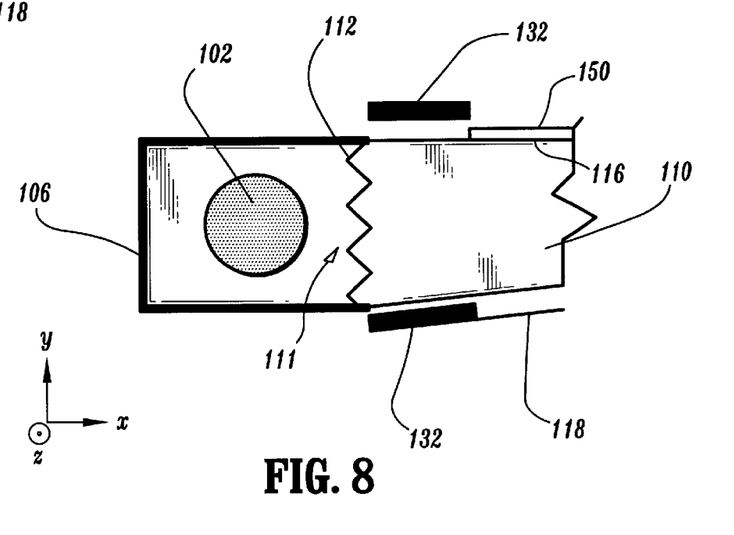
FIG. 8 is a partial side view of a light guide system which employs ridges extending along an entrance surface of a light guide to achieve a uniform distribution of light along the light guide in accordance with the present invention.

Referring to FIG. 8, a high degree of collimation in the direction perpendicular to the TIR direction can be achieved (in $\phi$) by adding ridges or prisms 150 extending in the x direction perpendicular to the axis of light source 102 on surface 116 of light guide 110.

As an example, the results of a simulation, performed by the inventors, where 90 degree ridges 130 were used on the entrance edge 111 and on surface 116, found collimation of ±7.5 degrees FWHM in the TIR direction and ±9.5 degrees FWHM in the non-TIR direction and good uniformity along the guide. The guide taper angle was 0.55 degrees.

It is to be understood that the embodiments shown in the FIGS. above may be combined to achieved desired results. For example, collimating element 140 may be combined with ridges 150 to achieve collimation in the two directions perpendicular to the TIR of the light guide. The pattern of ridges or other features, along the entrance edge of light guide 110 are preferably uniformly spaced and sized and of a sufficiently small scale such that no visual artifacts result, for example, on a liquid crystal display as the light distributions propagate along tapered light guide 110.

Figure 9:
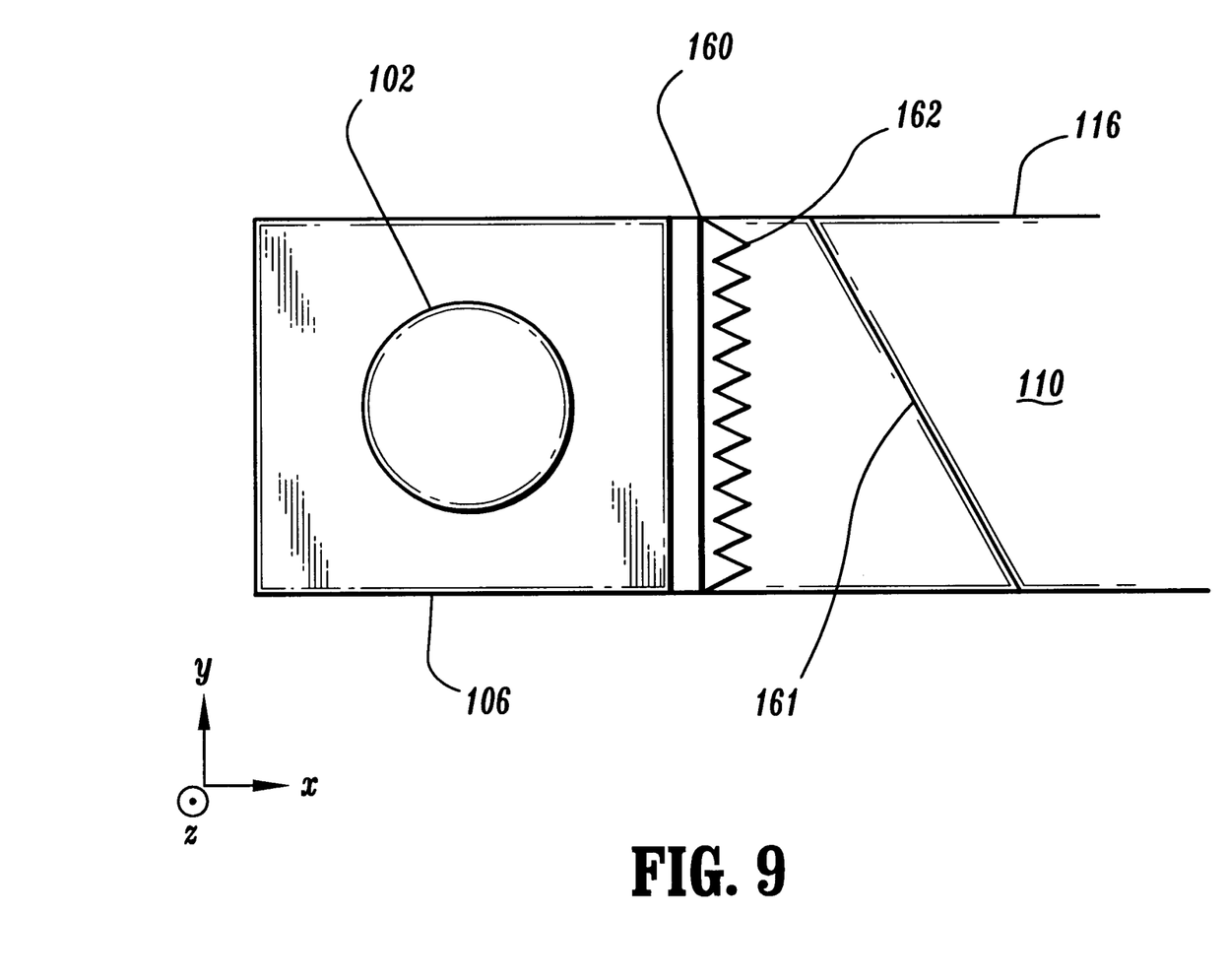
FIG. 9 is a partial side view of a light guide system which employs an external device, including a ridge sheet to achieve a uniform distribution of light along the light guide in accordance with the present invention.

Referring to FIG. 9, an alternate embodiment of the present invention is shown. This embodiment includes an external device 160 to modify the distribution of light in the y-x plane (i.e., $\alpha$) which is incident on an input end 161 of a light guide 110. External device 160 may include a ridge sheet with ridges 162 which extends parallel to the axis of light source 102 (e.g., along the z-axis). Input end 161 preferably forms an acute angle with respect surface 116 to more uniformly distribute light in light guide 110. Other combinations of external devices and input end structures are also contemplated.

Figure 10:
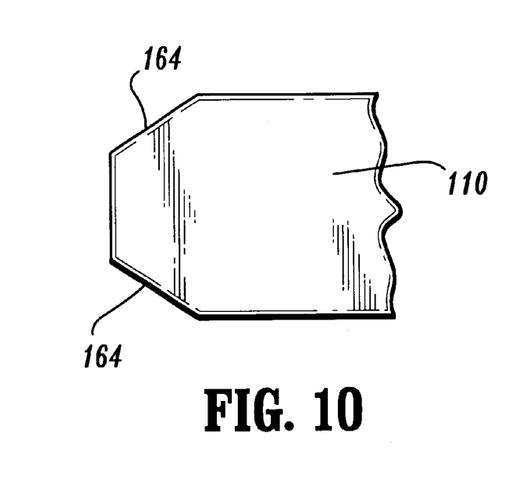
FIGS. 10 and 11 are a partial side views of light guides which employs facets extending along an entrance surface of the light guide to achieve a uniform distribution of light along the light guide in accordance with the present invention.
Figure 11:
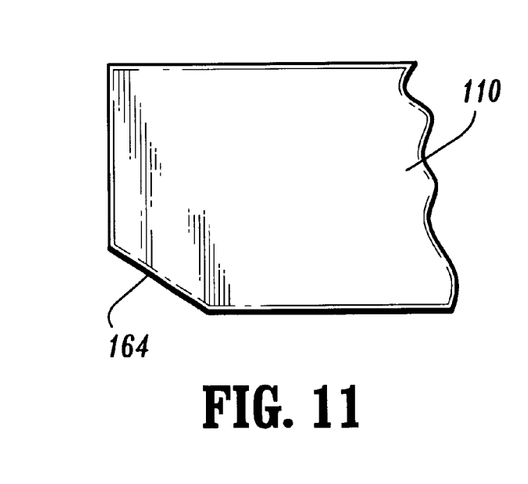
Figure 12:
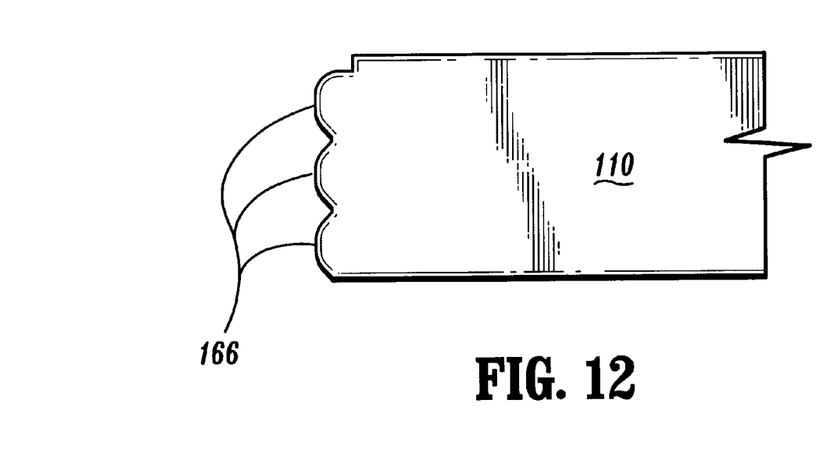
FIG. 12 is a partial side view of a light guide which employs curved surfaces extending along an entrance surface of the light guide to achieve a uniform distribution of light along the light guide in accordance with the present invention.

Referring to FIGS. 10 and 11, facets 164 may be employed on the entrance portion of light guide 110. Facets 164 may be employed with or without an external device (e.g., with or without external device 160). Facets 164 function in a similar way as ridges 130 described above. Facets 164 may be employed in combination with other embodiments as described above. Referring to FIG. 12, light guide 110 may include curved or faceted structures 166 which extend along the entrance portion of light guide 110. Facets 164 and structures 166 preferably extend into the plane of the page.

Figure 13:
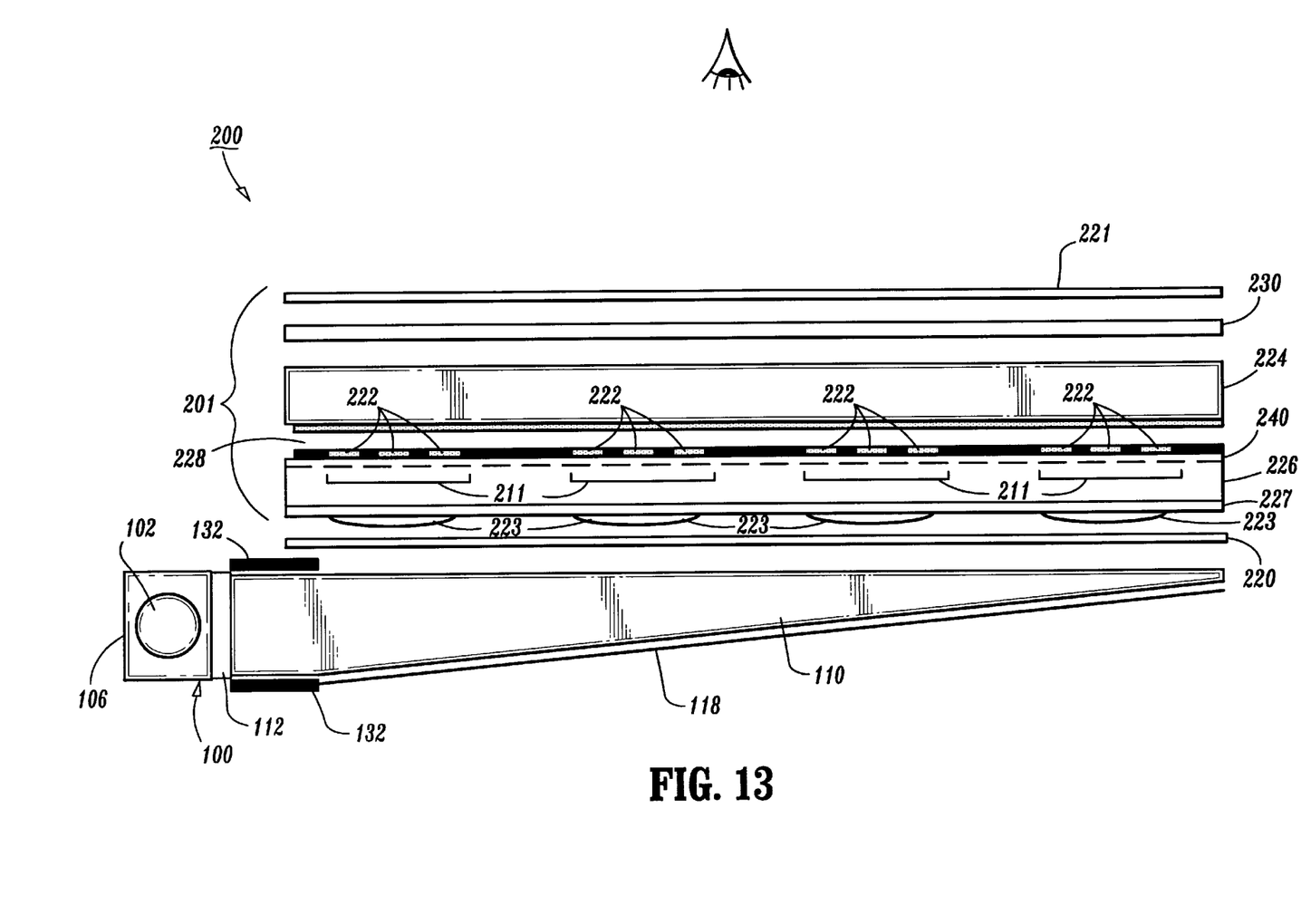
FIG. 13 is a side schematic view of a color filterless display device which employs a light guide system in accordance with the present invention.

Referring to FIG. 13, a liquid crystal display device 200, such as an active matrix liquid crystal display (AMLCD) is illustratively shown in accordance with the present invention. It is to be understood that other backlit displays or display types may also be employed in accordance with the present invention. Light is directed by system 100 as described with reference to FIGS. 4–12 to provide light to display components 201. Light source 102 and reflector 106 direct light into an acrylic light guide 110, which has no printed dot pattern on it so that light can only escape when its angle of incidence exceeds the critical angle. The structure of the light guide 110 is such that the light only exits from the top surface of the light guide 110 either directly or after reflection from mirror sheet 118 with a fairly narrow distribution of angles, such as, $\theta=7.5$ degrees FWHM and $\phi=\pm9.5$ degrees FWHM. The light source 102 may include triband phosphors, so the light produced is mainly in three distinct Red, Green, and Blue (RGB) bands. Mirror 118 serves to reflect light upward to display components 201.

A sheet 220, such as a transmissive diffracting element, may be employed to break light down into color components for a color filterless display, as is known in the art. Lenticular lenses 223 on the bottom of a back polarizer 227 of the active matrix liquid crystal display (AMLCD) then focus the separated RGB light through the appropriate sub-pixels 222 and into liquid crystal 228 between substrates 226 and 224. Three sub-pixels 222 comprise a pixel 211. Top or front polarizer 230 may be employed, and diffuser 221 may be included to scatter the light. Alternately, a color filter layer 240 may be employed in the path of light through sub-pixels 222 to permit only predetermined wavelengths of light through sub-pixels 222. Other structures or display types, known in the art, may also be employed and benefit from the present invention.

Figure 14:
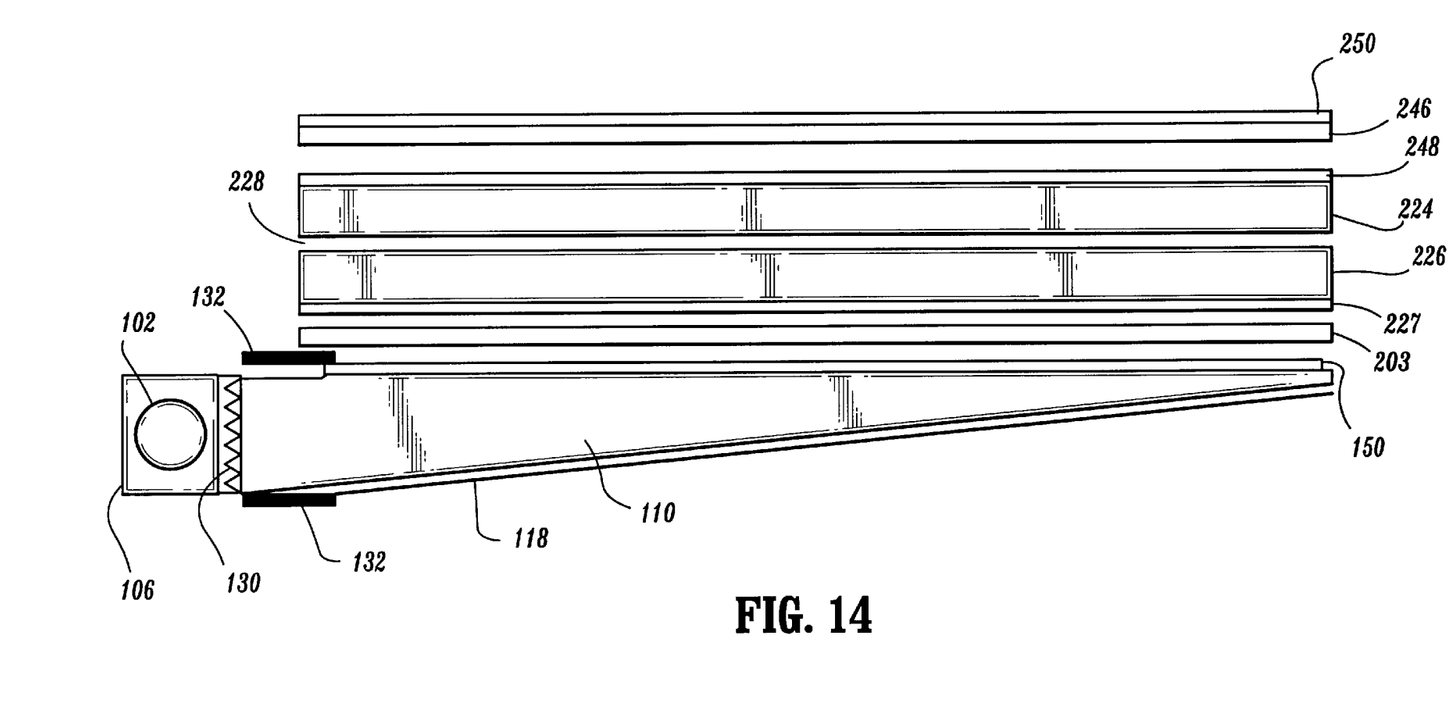
FIG. 14 is a side schematic view of a collimate and post diffuse type display device which employs a light guide system in accordance with the present invention.

Referring to FIG. 14, a collimate and post diffuse type display is shown in accordance with the present invention. A prism bending sheet 203 is used to redirect the highly collimated light into the direction normal to the display (i.e., change the peak intensity from θ=81 degrees to θ=0 degrees). The liquid crystal display is thereby illuminated with highly collimated light. The light is subsequently diffused by diffuser 246 which results in a wide viewing angle with an improved contrast ratio compared to a conventional twisted nematic (TN) mode display. If a low birefringence volume diffuser is used on a top polarizer 248, a second exit polarizer 250 may be used to improve the ambient contrast ratio.

Having described preferred embodiments of a highly collimating tapered light guide for uniform illumination of flat panel displays (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A light guide system for providing back-light illumination, comprising:
   a light guide having a first end portion opposite a second end portion, the light guide including a first surface and a second surface between the first and second end portions, the second surface being inclined relative to the first surface;
   a mirror disposed parallel to the second surface;
   a light source disposed along the first end portion on a first axis; and
   a light redistribution device disposed at an entrance of the light guide for receiving light from the light source and redistributing a portion of the light perpendicular to the first axis to provide a uniform light distribution from the first surface.

2. The light guide system, as recited in claim 1, wherein the first surface and the second surface are smooth.

3. The light guide system, as recited in claim 1, wherein the second surface is inclined relative to the first surface to produce collimated light by total internal reflection along the light guide.

4. The light guide system, as recited in claim 1, wherein the light redistribution device includes a structured entrance surface for the light guide.

5. The light guide system, as recited in claim 4, wherein the structured entrance surface includes a plurality of ridges extending parallel to the first axis.

6. The light guide system, as recited in claim 5, wherein the plurality of ridges is integrally formed in the light guide.

7. The light guide system, as recited in claim 4, wherein the structured entrance surface includes at least one facet forming an angle other than a perpendicular angle with the first surface and extending parallel to the first axis.

8. The light guide system, as recited in claim 4, wherein the structured entrance surface includes at least one curved surface extending parallel to the first axis.

9. The light guide system, as recited in claim 1, further comprising a plurality of ridges extending perpendicular to the first axis.

10. The light guide system, as recited in claim 1, further comprising a plurality of ridges disposed on the first surface and extending perpendicular to the first axis.

11. The light guide system, as recited in claim 1, further comprising a black material separated by a gap from at least one of the first surface and the second surface of the light guide for absorbing a portion of the light from the light source.

12. A light guide system for providing back-light illumination, comprising:
    a light guide having a first end portion opposite a second end portion, the light guide including a first surface and a second surface between the first and second end portions, the second surface being inclined relative to the first surface;
    a light source disposed along the first end portion wherein the first end portion defines a first axis and the light source extends along the first axis; and
    a structured entrance formed in the first end portion of the light guide, the structured entrance including a plurality of angled surfaces extending along the first axis for redirecting light received from the light source to provide a uniform light distribution from the first surface of the light guide.

13. The light guide system, as recited in claim 12, wherein the first surface and the second surface are uniformly smooth.

14. The light guide system, as recited in claim 12, wherein the second surface is inclined relative to the first surface to provide total internal reflection in the light guide.

15. The light guide system, as recited in claim 12, wherein the structured entrance includes a plurality of ridges extending parallel to the first axis.

16. The light guide system, as recited in claim 15, wherein the plurality of ridges include triangular shaped cross-sections.

17. The light guide system, as recited in claim 12, further comprising a plurality of ridges formed on the structured entrance and extending perpendicular to the first axis.

18. The light guide system, as recited in claim 12, further comprising a plurality of ridges disposed on the first surface and extending perpendicular to the first axis.

19. The light guide system, as recited in claim 12, further comprising a black material separated by a gap from at least one of the first surface and the second surface of the light guide for absorbing a portion of the light from the light source.

20. The light guide system, as recited in claim 12, further comprising a faceted reflector adapted to redirect light entering the light guide.

21. The light guide system, as recited in claim 12, wherein the structured entrance includes at least one facet forming an angle other than a perpendicular angle with the first surface and extending parallel to the first axis.

22. The light guide system, as recited in claim 12, wherein the structured entrance includes at least one curved surface extending parallel to the first axis.

23. A light guide system for liquid crystal displays, comprising:
    a light guide having a first end portion opposite a second end portion, the light guide including a first surface and a second surface between the first and second end portions, the second surface being inclined relative to the first surface;

a light source disposed along the first end portion wherein the first end portion defines a first axis and the light source extends along the first axis;

a reflector surrounding a portion of the light source and extending along the first axis to reflect light from the light source into the light guide;

a mirror disposed parallel to the second surface;

a structured entrance formed in the first end portion of the light guide, the structured entrance including a plurality of angled surfaces extending along the first axis for redirecting light received from the light source to provide a uniform light distribution from the first surface of the light guide; and a liquid crystal pixel array disposed in operative relationship with the first surface for receiving light directed from the first surface to render an image.

24. The light guide system, as recited in claim 23, wherein the first surface and the second surface are uniformly smooth.

25. The light guide system, as recited in claim 23, wherein the second surface is inclined relative to the first surface to provide total internal reflection within the light guide.

26. The light guide system, as recited in claim 23, wherein the structured entrance includes a plurality of ridges extending parallel to the first axis.

27. The light guide system, as recited in claim 26, wherein the plurality of ridges include triangular shaped cross-sections.

28. The light guide system, as recited in claim 23, further comprising a plurality of ridges extending perpendicular to the first axis.

29. The light guide system, as recited in claim 23, further comprising a plurality of ridges disposed on the first surface and extending perpendicular to the first axis.

30. The light guide system, as recited in claim 23, further comprising a black material separated by a gap from at least one of the first surface and the second surface of the light guide for absorbing a portion of the light from the light source.

31. The light guide system, as recited in claim 23, wherein the reflector is faceted to redirect light entering the light guide.

32. The light guide system, as recited in claim 23, wherein the liquid crystal display includes a collimate and post diffuse display.

33. The light guide system, as recited in claim 23, wherein the liquid crystal display includes a color filterless display.

34. The light guide system, as recited in claim 23, wherein the structured entrance includes at least one facet forming an angle other than a perpendicular angle with the first surface and extending parallel to the first axis.

35. The light guide system, as recited in claim 23, wherein the structured entrance includes at least one curved surface extending parallel to the first axis.

* * * * *